United States Patent Office 3,270,179
Patented August 30, 1966

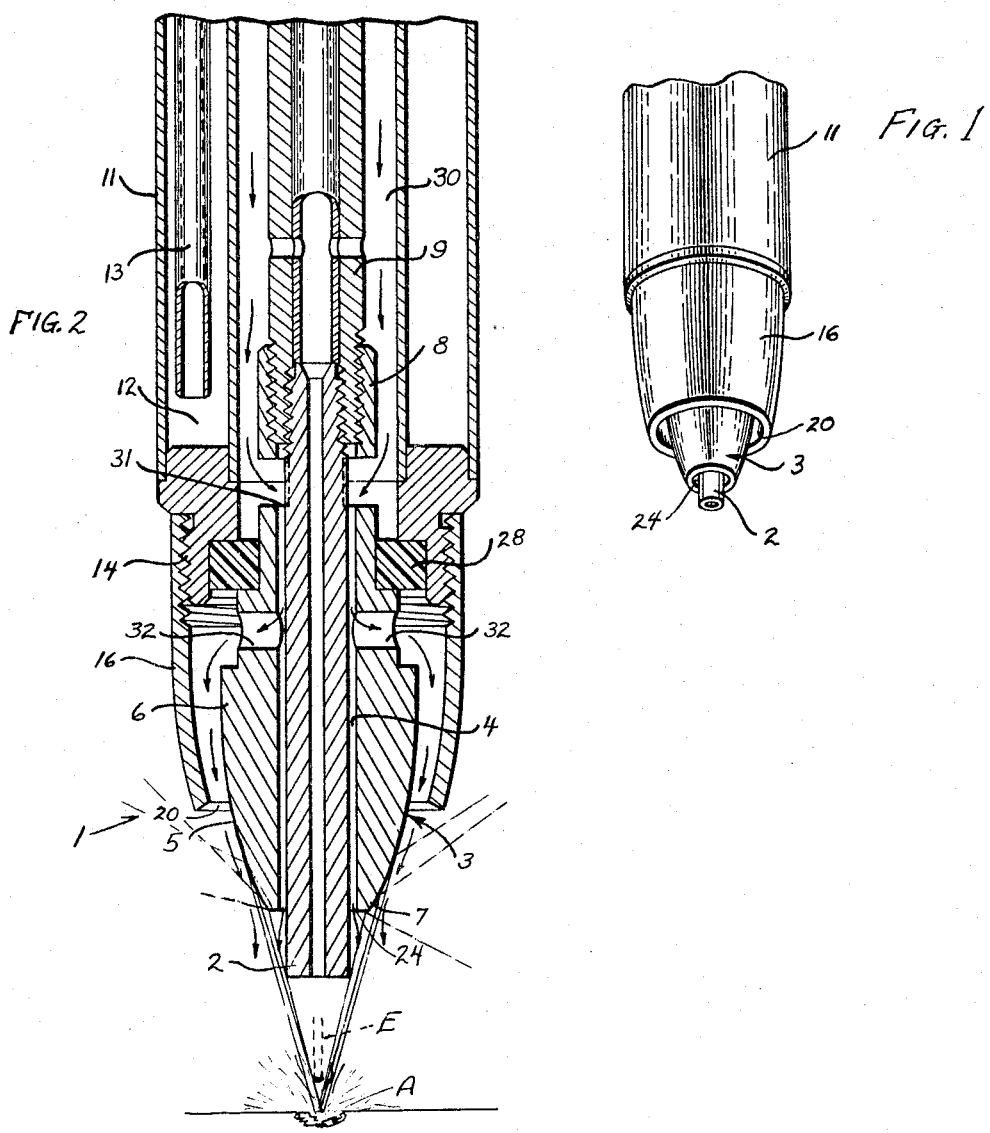

3,270,179
WELDING NOZZLE HAVING DUAL AND CONCENTRIC GAS SHIELDING
John A. Russell, Milwaukee, Wis., assignor to Harnischfeger Corporation, Milwaukee, Wis., a corporation of Wisconsin
Filed Nov. 10, 1965, Ser. No. 507,209
4 Claims. (Cl. 219—74)

This invention relates generally to an arc welding nozzle which uses a consumable electrode and wherein the arc is shielded with a gas to prevent oxidation of the molten metal.

The present invention has been assigned to an assignee common with the subject matter of a patent application Ser. No. 477,673, filed August 3, 1965, and entitled "Welding Nozzle."

It has heretofore been proposed to use a welding nozzle having concentric, gas shielding openings from which gas is directed around the arc. Examples of prior art of this type are shown in the U.S. Patent No. 2,859,329 issued November 4, 1958, and U.S. Patent No. 2,919,341 issued December 29, 1959. These prior art devices have certain shortcomings, however, the primary one of which is the lack of operator visibility in the area of the arc. These prior art devices, while utilizing a pair of concentric gas shielding openings, arrange the openings so that they are either in axial alignment or the outer opening extends more closely to the arc than does the inner opening. This prior art arrangement was necessitated in order to insure that the gas reached the arc area in a protective manner. Another serious disadvantage of these prior art devices was that the gas openings were subjected to plugging due to arc spatter.

The present invention provides a welding nozzle having means for supplying two distinct curtains or shields of welding gas for the arc, the shields being arranged not only concentrically with one another, but the radially outer one is also located axially to the rear or farther from the arc itself. Because of the converging or tapered shape of the nozzle in a direction toward the arc, and the staggered or axially spaced positioning of the openings, these gas openings present a minimum area subjected to weld spatter. Stated otherwise, as taught in the said patent application Serial No. 477,673, the gas follows the curved contour of the nozzle so as to envelop the arc and it is this curved surface that partially shields the gas openings; also making the radially outer concentric gas opening more remote from the arc than is the inner opening, the area exposed to the welding spatter is reduced and furthermore improved arc visibility is available to the operator.

It is generally an object of the present invention to provide an improved welding nozzle of the dual, coaxial gas shield type, wherein the outer gas shield is located more remotely from the arc and consequently good gas opening protection is provided against weld spatter as well as excellent visibility of the arc by the operator.

These and other objects and advantages of the present invention will become more apparent as this disclosure progresses, reference being had to the following drawings in which:

FIGURE 1 is a fragmentary, perspective view of an arc welding nozzle made in accordance with the present invention, and FIGURE 2 is a longitudinal cross sectional view through the nozzle shown in FIGURE 1, certain parts being shown as broken away and in section for clarity, and also showing how the gas openings are shielded from the weld spatter.

Referring in greater detail to the drawings, the nozzle end indicated generally at 1 includes an electrode contact tube 2, a tapered or bullet shaped nose 3 having an axial passage 4 through which the contact tube 2 extends. The bullet shaped nose converges toward the arc A and has a peripheral, curvilinear, outer surface 5 that tapers from a thicker, intermediate portion 6 to a relatively narrow, outer end 7. This nose 3 is then threaded at its inner end 8 on the contact tube body 9 of the contact tube.

It will be noted that the contact tube extends outwardly beyond the end of nose 3.

Contact tube body 9 is housed in a water cooled cylindrical jacket 11 which defines water cooling chamber 12 and includes water conduits 13 for circulating fluid coolant through the jacket.

A gas cup 16, is threaded on the outer end 14 of the jacket and extends axially and partially surrounds the nose 3. It will be noticed that the interior, curved surface of the cup is spaced a distance from the complementary curved surface of the nose so as to provide an opening 20 from which the shielding gas can be directed. It will be furthemore noted that the cup 16 terminates rearwardly or a distance remote from the outer end 7 of the nose. Thus the gas issuing from the opening 20 as indicated by the arrows, follows along the curved surface of the nose 3 to protect the arc A.

The second gas shield opening 24 is provided more closely to the arc than opening 20 and is arranged concentrically with the opening 20. This second opening 24 is defined by the passage 4, that is, by the space between the nose and the contact tube.

The contact tube 2 and nose 3 are insulated from the gas cup 16 and the jacket 11 by means of an annular insulating ring 28 which may be of nylon or other heat resistant, insulating material.

The shielding gas is introduced through an annular gas conduit 30 which is defined by the space between the jacket and conduit body and it then flows through the radially extending orifices 31 in the inner end of the nose 3. The gas then takes two paths in its continued travel to the arc, namely it will flow outward through the cross ports 32 and then through the outer opening 20 and along the curved peripheral surface of the nose. It will also flow axially through the passage 4 and out the opening 24.

*Résumé*

By means of the present invention the shieding gas follows the curved surface of the nozzle and two separate and axially spaced concentric gas shields are effective to shield the arc. The end of the tube and the nozzle extend between the inner and outer openings, respectively, and the arc and thereby shield the openings from arc spatter. Furthermore, with this nozzle which has a general tapering shape and a narrow or small end, and the forward protruding tube end and rearward enlarged gas cup 16, exceptionally good visibility of the arc is assured for the operator and he can see the tip of the electrode E without difficulty.

Various modes of carrying out the invention are contemplated as being within the scope of the following claims particularly pointing out and distinctly claiming the subject matter which is regarded as the invention.

I claim:

1. An arc welding nozzle having a nose, said nose having an outer end and also having a passage extending therethrough so that an electrode can pass through said nose and extend from said nose end for being consumed by an arc, said nose being tapered so as to converge toward said end, a contact tube extending through said passage and extending axially beyond said nose end, and means defining a pair of concentric gas openings around said tube for directing shielding gas toward said nose end, the radially outer opening also being spaced axially a distance farther from said nose end than the inner opening, said inner opening being defined by a space between said tube and said nose, and said tube being adapted to receive said electrode for movement therethrough.

2. The nozzle as defined in claim 1 further characterized in that said nose partially shields said outer opening from said arc.

3. The nozzle set forth in claim 1 further characterized in that said tube and nose partially shield said inner and outer openings, respectively, from spatter of said arc by extending between said arc and said openings.

4. The nozzle described in claim 1 further characterized in that said means includes a cup surrounding said nose and located a distance axially from said nose end and in a direction away from said arc, said cup together with said nose defining said outer opening.

References Cited by the Examiner
UNITED STATES PATENTS

| | | | |
|---|---|---|---|
| 2,859,328 | 11/1958 | Sohns | 219—74 |
| 2,864,934 | 12/1958 | Bernard et al. | 219—74 |
| 2,902,587 | 9/1959 | Bernard | 219—74 |

RICHARD M. WOOD, *Primary Examiner.*